Aug. 10, 1937.  F. B. LOMAX  2,089,215
APPARATUS FOR FILTERING EGGS
Filed Feb. 7, 1935
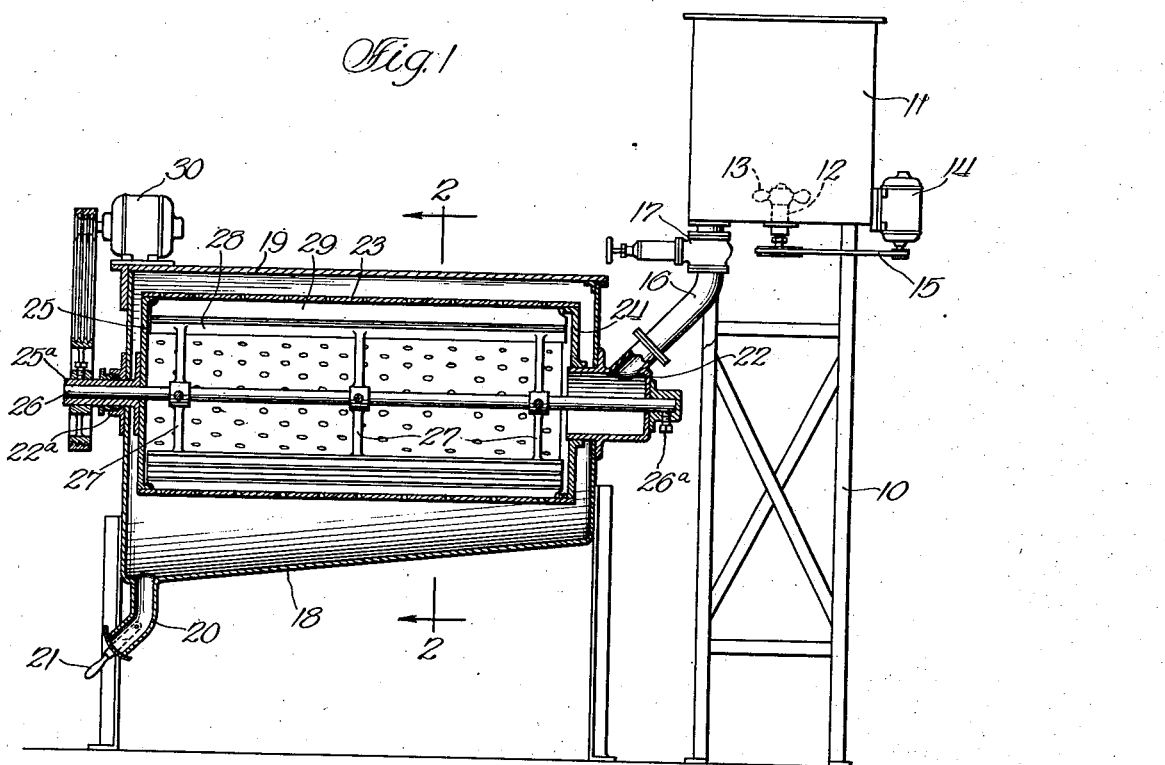
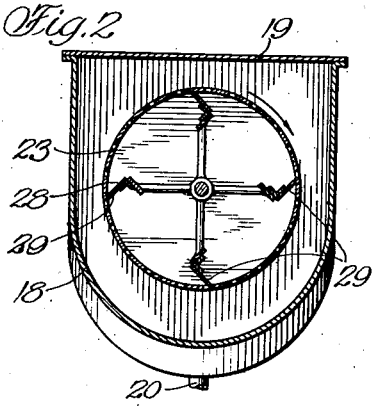
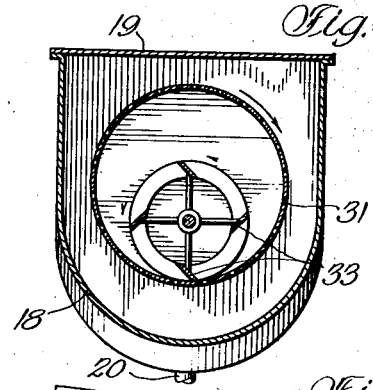
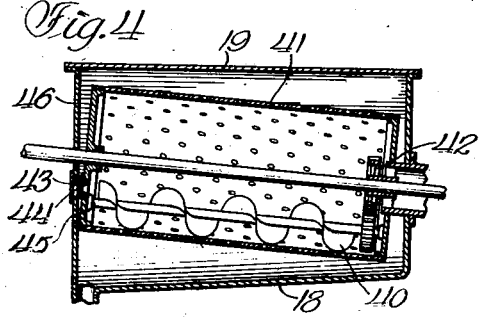
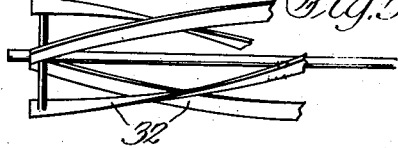
Inventor:
Frank B. Lomax Patented Aug. 10, 1937

2,089,215

UNITED STATES PATENT OFFICE 2,089,215

APPARATUS FOR FILTERING EGGS

Frank B. Lomax, Chicago, Ill.

Application February 7, 1935, Serial No. 5,329

6 Claims. (Cl. 210—151)

The present invention relates to apparatus for preparing eggs for freezing and storing for subsequent use in the baking and confectionery trade and more specifically relates to apparatus for cleansing the eggs of shell and other foreign substances and lumpy matter.

Frozen eggs are very extensively used by the trade because they are more economical than eggs not so prepared and because more uniform in color, quality and consistency.

It has been the aim of canners to produce frozen eggs free from foreign matter, such as egg shells, dirt, hard fibrous parts of the yolk sac or other lumpy matter and to mix the egg meats thoroughly to produce a uniform color or texture, free from streaks. Such canners have endeavored to prevent air from being incorporated into the egg meats for air so mixed produces foam.

In the present invention, no pump in any form is used to transfer or move the egg meats. Gravity is used to transfer the egg meats from a mixing tank to the cans in which they are stored. During a gravitational flow the eggs are filtered to remove shells and to otherwise cleanse them of lumpy material.

The filter consists of a wire mesh screen or a perforated sheet metal member of a porosity that will remove particles of shell or other undesirable matter. It either disintegrates or removes chalaza. Matter that cannot be forced through the filter will remain on the filter bed.

An examination of the drawing will show that the apparatus illustrated not only forces the egg meats through a filter, but it is so constructed that the filter walls are cleansed or scraped during operation. The material gathered from the sides of the filter wall is collected at the interior of the filter and may be removed. This always keeps the filter clean over a long period of time and a much larger amount of egg meats may be filtered before it is necessary to remove the screen for complete cleaning.

The present invention therefore may be said to deal with the continuous filtration of egg material. A difficulty heretofore encountered in the filtration of egg material has been that the filter clogs rapidly. The present invention overcomes any difficulty.

Included in the objects of the present invention are the provisions of the following:

A continuously operable egg filter;

An egg filter having a screen or filter face which may be scraped and cleansed;

An improved egg filter;

An egg filter having a screen surface which may be continuously scraped; and

An egg filter in which a beater for the egg meats is used to force such material through the filter.

These objects, and such other objects as may hereinafter appear, are obtained by the novel construction, unique combination, and improved arrangement of the several elements which constitute the invention, several embodiments of which are illustrated in the accompanying single sheet of drawing hereby made a part of this specification, and in which:

Figure 1 is a vertical view partly in elevation and partly in section of an apparatus embodying the subject matter of the present invention;

Figure 2 is a transverse section on the line 2—2 of Figure 1;

Figure 3 is a transverse section view of a modified form of the invention;

Figure 4 is a schematic longitudinal section of a means for ridding the apparatus of material filtered out of the eggs; and Figure 5 is a fragmentary elevation of a movable scraper which may be used with a stationary filter.

Like reference characters are used to designate similar parts in the drawing and in the description of the invention which follows.

Figure 1 illustrates a support 10 comprising upright main and obliquely disposed brace members. A tank 11 is disposed on frame 10. The tank 11 has a central bottom aperture in which a shaft 12 having a mixing propeller 13 secured thereto is journalled. The shaft 12 externally of tank 11 is provided with a pulley. At the side of the tank 11 is a motor 14 which rotates a drive pulley. Between the drive pulley and the pulley upon the shaft 12 is a suitable belt 15.

There is a second aperture in tank 11 for emptying its contents into a conduit 16. Conduit 16 is provided with a suitable valve 17 for controlling liquid flow. The conduit 16 empties the contents of tank 11 into the interior or central part of a filter housing 18. The housing 18 comprises a generally semicylindrical bottom wall, vertical side walls and a cover 19. The bottom may slope to facilitate draining. Such sloping portion terminates in a discharge conduit 20 in which is a suitable valve 21.

The filter housing 18 is supported upon suitable standards or legs and has at its receiving end a projecting head 22 into which the conduit 16 from the receiving tank empties.

A filter in the housing 18 may be stationary and be supplied with scrapers rotated therewithin, or such filter may be rotatably mounted, and the scrapers used therewithin stationary. In the form of the device illustrated in Figures 1 and 2, the filter 23 comprises a cylindrical member, either of perforated metal or metal screen of a porosity which will separate from the egg meats appreciable portions of shell, disintegrate or remove chalaza, disintegrate or remove meat balls, remove other foreign lumpy matter, and render the egg material highly homogeneous and freely miscible.

At the ends of the filter housing 18 are supporting plates 24 and 25 which close the ends of the filter and maintain it in spaced relation to the end and sides of the filter housing 18. Plate 24 has a central aperture telescoping over the open end of head 22 and is journalled for rotation on the periphery of head 22. Egg material may be discharged from the filter 23 only by way of the perforate cylindrical walls thereof. Plate 25 is rotatable upon a shaft 26 locked within the housing 18 by lock screw 26a the shaft 26 supporting at spaced intervals spiders 27. The spinders 27 support longitudinal scraping members 28. The number of scrapers 28 is a matter of choice, four being shown.

The scrapers 28 have a toe 29 which closely contacts the interior wall of the filter 23, scraping material therefrom and cutting off that portion of material which has passed partly through the filter and thus separating it from the part which remains within the filter. The shape of the toe is such that it tends to force material through the pores or apertures in the filter 23.

Plate 25 is secured to a flanged sleeve 25a riding on shaft 26 and journaled in a packing box 22a and about which is a pulley. A motor 30 is mounted upon housing 18 or cover 19 and a belt extends from a drive pulley on motor 30 to driven pulley upon sleeve 25a.

To employ the apparatus, egg material is deposited in the receiving tank 11. The mixing propeller 13 is put in motion. The valve 17 in conduit 16 is opened and material flows from the tank 11 into the filter housing 18 in a volume controlled by valve 17. The filter 23 quickly fills. The motor 30 rotating filter 23 is then energized.

As the filter 23 is beneath the tank 11, the filter will be continuously filled to capacity by the contents of the tank. The blades or scrapers 28 will at all times be fully submerged within the egg material in the filter. As screen 23 rotates, the scrapers 28 will operate directly upon the egg material to press it against the surface of the filter and to cut off or force through the filter such material as tends to protrude into the apertures or pores thereof. The protruding portion will be forced through the filter and cut off from the portion which prevents the protruding part from passing through, or the whole material will be forced through the aperture or pore in the filter. The oblique angle of the blades 28 causes pressure to bear upon the material with which they come into contact. The rotation of the filter, therefore, will cause the blades to force material continuously through the filter.

Because the filtering surface of the filter 23 is large and the rotation thereof continuous, the filter has a large capacity. The filtered material as it is forced from the filter collects in the rounded bottom thereof to flow to the discharge conduit 20. It may be collected in the filter to the capacity thereof and then drawn off through such conduit.

Figure 3 illustrates scrapers 33 which are suitably supported at their ends and rotated in one direction. The cylinder 31 is suitably journalled and rotated in the opposite direction, the scrapers 33 contacting a limited and ever changing arc in the periphery of the filter. The efficiency of this form of the device is substantially the same as that of the form illustrated in Figures 1 and 2. When desired, the cylinder may be stationary and the scraper blades rotated. Blades 32 shown in Figure 5 are arranged in helical arcs. Such an arrangement causes the blades to force material through the filter. The blades 33 in Figure 3 are of this type. The blades 32 can be rotated either in a stationary or rotary filter or can be of the same diameter as the interior of the cylinder such as the scrapers 28 and held stationary when rotating the cylinder or can be rotated in an opposite direction to the direction of rotation of the cylinder.

In Figure 4, a means for discharging material which gathers in the interior of a filter during its operation is illustrated. Such means comprise a ribbon conveyor or worm 40 which is mounted for rotation within the interior of a filter 41 when the cylinder is of the rotating type. When the filter has ceased rotating, covers are removed from suitable apertures 43 and 44 in the casing 45 and in the end supporting member 46 of the filter. The rotating ribbon conveyor 40 is put into operation by the use of gears 42 or other suitable driving means. The worm or screw 40 moves material which is collected within the filter 41 to proximity with the apertures 43 and 44 through which it may be removed.

What is claimed as new and is desired to be secured by Letters Patent of the United States is:

1. Egg filtering apparatus comprising a filter member of circular cross section for receiving egg material therein, said filter member having foraminations in the side walls thereof of a size accepting egg meats therethrough but rejecting egg shell fragments, a scraper within said filter member having a toe sloping angularly into contact with the side walls of the filter member to squeeze egg meats through the filter and to cut off those portions of egg material passed partly through the filter from the portions remaining within the filter and means effecting relative movement between the scraper and filter member.

2. Egg filter apparatus comprising a cylindrical filter having a porosity adapted to remove appreciable portions of egg shells and to remove or disintegrate chalaza from egg meats, a scraper upon the interior of said filter, and having a front face sloping backward from perpendicular relation to the porous filter walls to squeeze eggs through said filter and cut off egg chalaza partly passed through the filter from the portions within the filter and means for effecting relative movement between said filter and said scraper.

3. Egg filtering apparatus comprising a tank for receiving shelled egg material therein, an agitator in the bottom of the tank to uniformly mix the egg material, a drain conduit extending from the bottom of the tank, means for regulating the drainage of egg material through said conduit, an elongated receptacle at a level below said tank, a filter member of circular cross section mounted in said receptacle for receiving therein egg material from the drain conduit, said filter member having solid end walls and a porous side wall, a scraper in said filter member having blades extending into close proximity to the side walls of the filter member with the scraping faces thereof at an obtuse angle to said side wall, means for effecting relative movement between said scraper and said filter member whereby egg meats are squeezed through the filter member and egg chalazae partly passed through the filter member are cut off from the portions thereof remaining within the filter member and a drain for removing filtered egg material from the receptacle.

4. Egg treating apparatus for filtering egg meats without incorporation of appreciable amounts of air therein thereby avoiding a foaming of the eggs which comprises a receptacle for receiving egg meats, shell fragments, chalaza, and the like egg material therein, an agitator in said receptacle near the bottom thereof adapted to mix the egg material therein from below the surface of the material thereby avoiding incorporation of appreciable amounts of air therein, a tank adjacent said receptacle, a filter member of circular cross section horizontally disposed in said tank, said filter member having a foraminous side wall in spaced relation from the walls of the tank, the foramina of said wall being of a size to permit passage of egg meats and disintegrated chalaza therethrough but preventing passage of shell fragments and unbroken chalaza, a conduit for conveying mixed egg material from the receptacle to the interior of the filter member, a scraper in said filter member having blades extending into close proximity to the foraminous side wall thereof and adapted to force egg meats through the foramina, to cooperate with the foramina in disintegrating chalaza and to remove matted material from the side wall of the filter, means for effecting relative movement between said scraper and said filter member, and a drain from said tank for removing filtered egg material therefrom.

5. Egg treating apparatus for filtering egg meats at atmospheric pressure without incorporation of appreciable amounts of air therein thereby avoiding a foaming of the eggs, which comprises a receptacle for receiving egg meats, shell fragments, chalaza, and the like egg material therein, an agitator in said receptacle near the bottom thereof adapted to mix the egg material therein from below the surface of the material thereby avoiding incorporation of large amounts of air therein, a tank adjacent said receptacle, a cylindrical filter member rotatably mounted in said tank having a foraminous side wall in spaced relation from the walls of the tank, the foramina of said wall being of a size to permit passage of egg meats and disintegrated chalaza therethrough but preventing passage of shell fragments and unbroken chalaza, a conduit for conveying mixed egg material from the receptacle to the interior of the cylindrical filter member, means for rotating said filter member, a stationary scraper in said filter member having blades extending into close proximity to the foraminous side wall thereof and adapted to force egg meats through the foramina, to cooperate with the foramina in disintegrating chalaza and to remove matted material from the side wall of the filter, and a drain from said tank for removing filtered egg material therefrom.

6. Egg treating apparatus for filtering egg meats which comprises, in combination, a receptacle for receiving and accumulating a supply of egg meats, shell fragments, chalazae, and the like egg material therein, a tank adjacent to and at a lower level than said receptacle, a hollow filter member of circular cross-section enclosed within said tank, said filter member having a foraminous wall in spaced relation from the walls of the tank, the foramina of said wall being of a size to permit passage of egg meats and disintegrated chalazae therethrough but preventing passage of shell fragments and unbroken chalazae, a conduit for conveying egg material by gravity from the receptacle to the interior of the filter member, a scraper in said filter member having blades extending into contact with the foraminous side wall thereof, each being at an angle less than 180° with respect to said side wall and adapted to force egg meats through the foramina to cooperate with the foramina in disintegrating chalazae and to remove matted material from the side wall of the filter, and means for effecting relative movement between said scraper and said filter member.

FRANK B. LOMAX.